United States Patent [19]
Hsu

[11] Patent Number: 5,595,691
[45] Date of Patent: Jan. 21, 1997

[54] AIR SUPPLY APPARATUS FOR POND FISHERIES

[76] Inventor: Shui-Yuan Hsu, No. 40-3, Lane 702, An Chung Road, Sec. 1, Tainan City, Taiwan

[21] Appl. No.: 554,686

[22] Filed: Nov. 7, 1995

[51] Int. Cl.⁶ ...................................................... B01F 3/04
[52] U.S. Cl. ........................ 261/120; 261/123; 210/242.2
[58] Field of Search ................................... 261/120, 123; 210/242.2

[56] References Cited

U.S. PATENT DOCUMENTS

| | | | |
|---|---|---|---|
| 302,326 | 7/1884 | d'Heuyeuse | 261/120 |
| 3,193,260 | 7/1965 | Lamb | 261/120 |
| 4,863,644 | 9/1989 | Harrington et al. | 261/123 |
| 5,054,422 | 10/1991 | Nojimi et al. | 261/123 |
| 5,354,457 | 10/1994 | Beechi | 261/120 |

FOREIGN PATENT DOCUMENTS

| | | | |
|---|---|---|---|
| 966026 | 9/1950 | France | 261/123 |
| 2836452 | 2/1980 | Germany | 261/120 |

*Primary Examiner*—Tim R. Miles
*Attorney, Agent, or Firm*—Pro-Techtor International

[57] ABSTRACT

An air supply apparatus for pond fisheries which includes a framework, the framework consisting of two upright tubes, two extension tubes respectively and slidably inserted into the upright tubes, lock means to lock the extension tubes in the upright tubes at the desired elevation, a top transverse rack connected between the extension tubes at a top side, a bottom cross tube connected between the upright tubes at a bottom side by bends, and a cross bar connected between the upright tubes above the bottom cross tube; float means fastened to the top transverse rack for supporting the framework in water in a rearing pond; an air pump means mounted on the top transverse rack, and having an air output port connected to the bottom cross tube by an air tube; a plurality of air distributors respectively connected to the bottom cross tube for permitting air to be forced from the air pump means into water in the rearing pond in the form of air bubbles; and a baffle assembly adjustably fixed to the framework above the bottom cross tube at the desired elevation for detaining upward movement of air bubbles.

4 Claims, 5 Drawing Sheets

AIR SUPPLY APPARATUS FOR POND FISHERIES

BACKGROUND OF THE INVENTION

The present invention relates to air supply apparatus for pond fisheries, and relates more particularly to such an air supply apparatus which has a baffle assembly fastened to a cross bar on the framework thereof for detaining upward movement of air bubbles.

Various apparatus have been disclosed for use in pond fisheries for increasing the amount of air dissolved in water. These apparatus produce air bubbles in water so that oxygen can be dissolved in water. FIGS. 1 and 2 show a conventional apparatus for this purpose. This apparatus is comprised of a motor 20 mounted on a frame floating in water, and a pair of vane wheels 10 coupled to two opposite ends of the motor shaft of the motor 20. When the motor 20 is started, the vane wheels 10 are rotated to induce air bubbles in water. Because the working area is limited to the surface area of the rearing pond (see FIG. 2), it cannot supply air to the bottom side of the rearing pond. FIG. 3 shows another apparatus for this purpose which comprised of a floating frame unit 40, and a submerged motor drive unit 30 mounted on the floating frame unit 40 at the bottom side. The motor drive unit 30 comprises a submerged motor 302, and a propeller 301 driven by the submerged motor 302 to agitate water. One drawback of this apparatus is that the submerged motor consumes much power supply during its operation, thereby rendering itself unable to be continuously operated 24 hours a day. Another drawback of this apparatus is that the propeller agitates water heavily, causing water animals not dare to stay near the apparatus.

SUMMARY OF THE INVENTION

It is one object of the present invention to provide an air supply apparatus for pond fisheries which is power saving, and can be operated 24 hours a day. It is another object of the present invention to provide an air supply apparatus for pond fisheries which effectively releases fine air bubbles into water in the rearing pond when operated. It is still another object of the present invention to provide an air supply apparatus for pond fisheries which effectively detain upward movement of air bubbles in water for permitting oxygen to be effectively dissolved in water. It is still another object of the present invention to provide an air supply apparatus for pond fisheries which can be conveniently adjusted to fit different pond fisheries. According to one aspect of the present invention, the air supply apparatus comprises a framework, float means fastened to the top transverse rack for supporting the framework in water in a rearing pond, an air pump means mounted on the top transverse rack and having an air output port connected to the bottom cross tube by an air tube, and a plurality of air distributors respectively connected to the bottom cross tube for permitting air be forced from the air pump means into water in the rearing pond in the form of air bubbles, wherein a baffle assembly mounted on the cross bar to detain upward movement of air bubbles released from the air distributors, the baffle assembly comprising two symmetrical baffle boards pivotably connected to the cross bar at two opposite sides, and an angle adjustment frame connected between the cross bar and the baffle boards, the angle adjustment frame comprising two parallel upright frames fixedly secured to the cross bar, and two connecting bars connected between the baffle boards and the upright frames, the upright frames having a respective longitudinal slot, the connecting bars each having a fixed end pivoted to one baffle board, and a free end made with a longitudinal series of locating holes adjustably connected to the longitudinal slots of the upright frames by a lock. According to another aspect of the present invention, the framework comprises two upright tubes, two extension tubes respectively and slidably inserted into the upright tubes, lock means to lock the extension tubes in the upright tubes at the desired elevation, a top transverse rack connected between the extension tubes at a top side, a bottom cross tube connected between the upright tubes at a bottom side by bends, and a cross bar connected between the upright tubes above the bottom cross tube.

DETAILED DESCRIPTION OF THE PREFERRED EMBODIMENT

Figure 4:
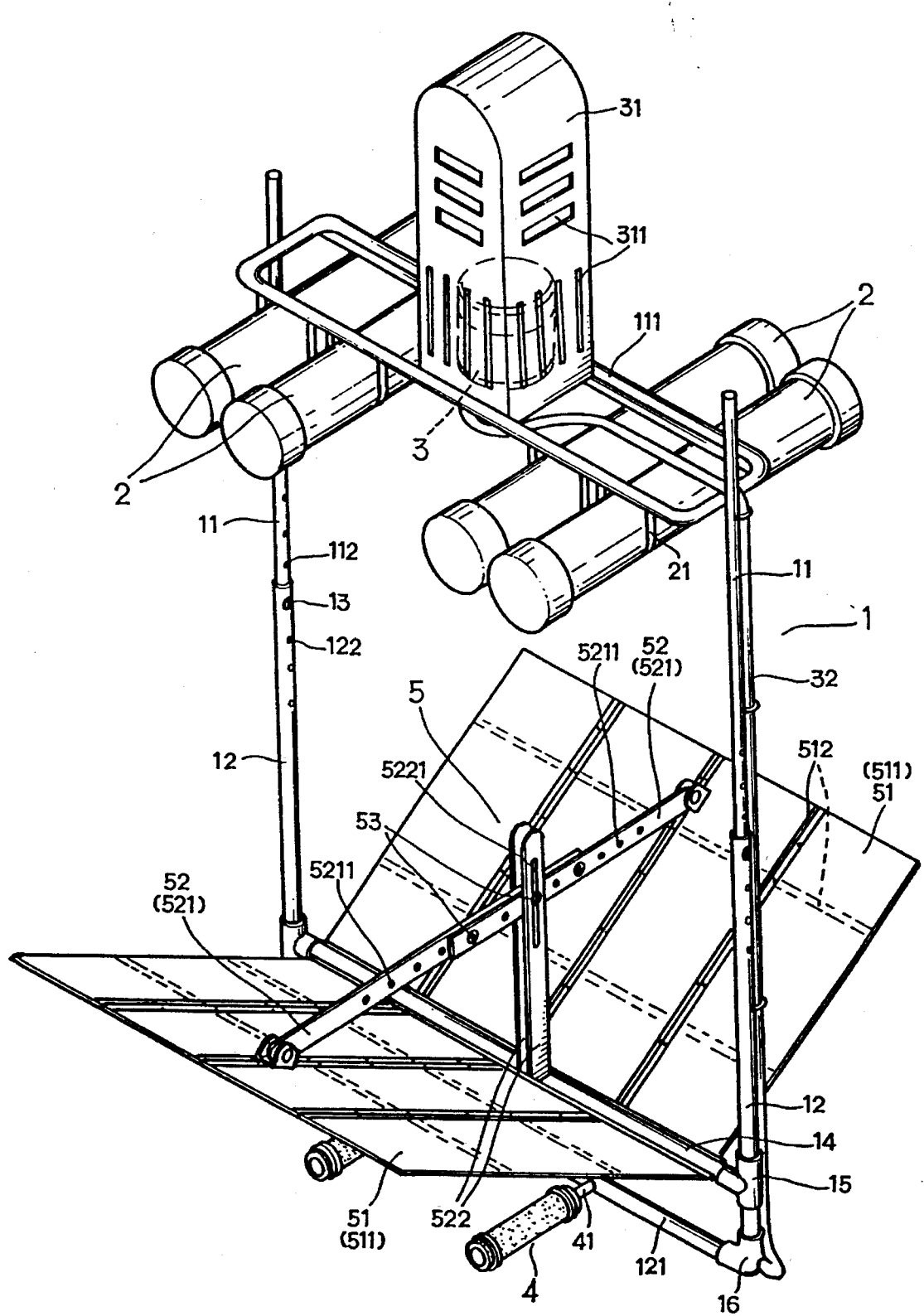
FIG. 4 is an elevational view of an air supply apparatus for pond fisheries according to the present invention.
Figure 5:
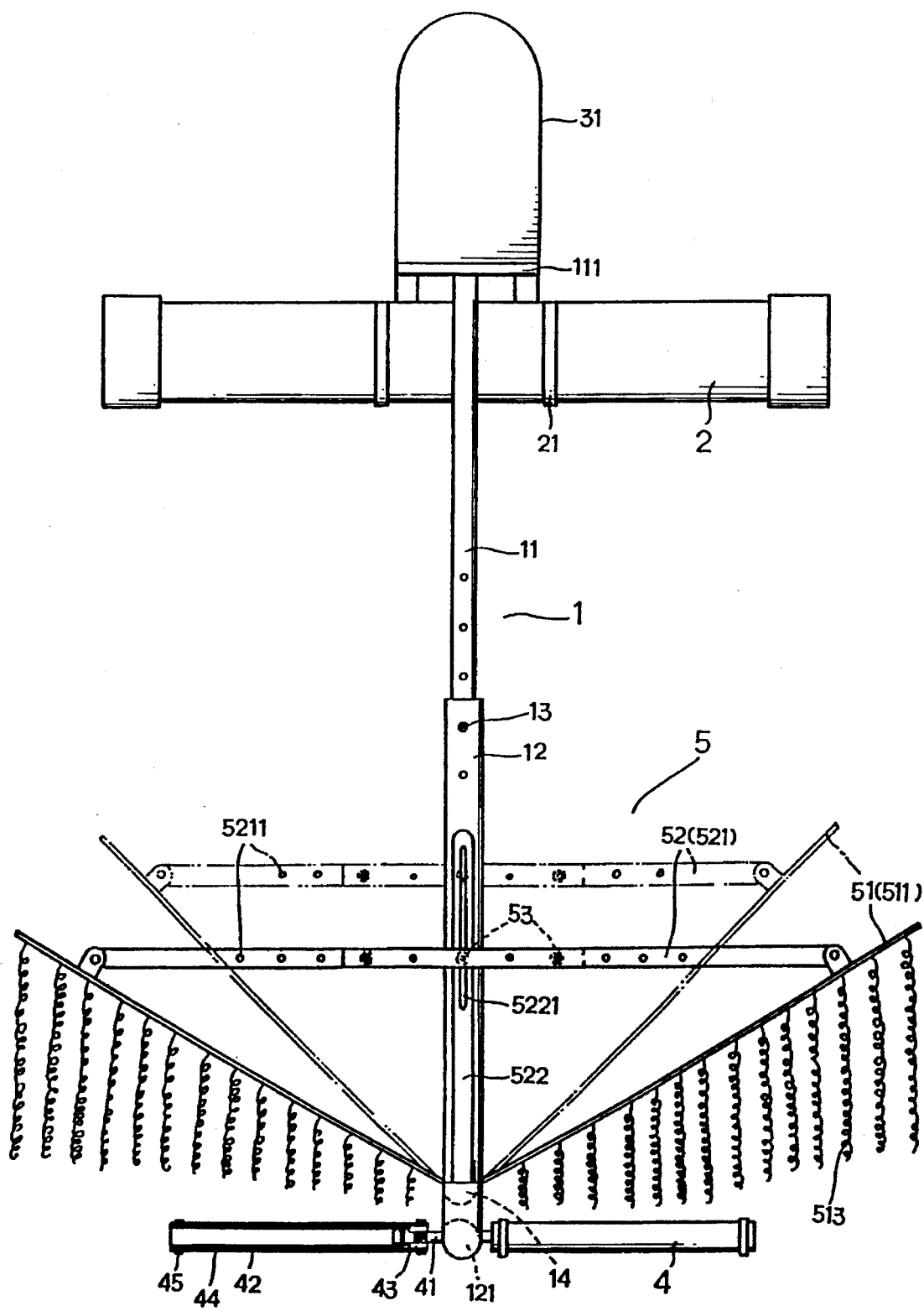
FIG. 5 is a plain view of the air supply apparatus shown in FIG. 4, showing the angular position of the baffle assembly adjusted.
Figure 6:
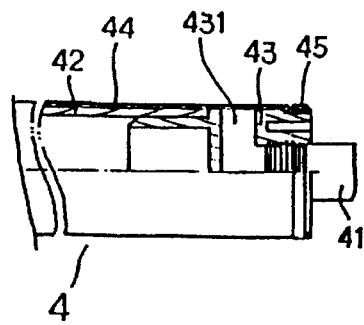
FIG. 6 is a sectional view of an air distributor according to the present invention.

Referring to FIGS. 4 and 5, an air supply apparatus for pond fisheries in accordance with the present invention is generally comprised of a framework 1, a plurality of floats 2, an air pump 3, a plurality of air distributors 4, and a baffle assembly 5. The framework 1 comprises two upright tubes 12, two extension tubes 11 respectively and slidably inserted into the upright tubes 12, a top transverse rack 111 connected between the extension tubes 11 at the top side, a bottom cross tube 121 connected between the upright tubes 12 at the bottom side by bends 16, a cross bar 14 connected between the upright tubes 12 above the bottom cross tube 121 by T-connectors 15. Each of the extension tubes 11 has a longitudinal series of locating holes 112 for connection to a longitudinal series of locating holes 122 on one upright tube 12 by a lock 13. The floats 2 are bilaterally fastened to the top transverse rack 111 of the framework 1 at the bottom side by suspension wires 21. The air pump 3 is mounted on the top side of the top transverse rack 111 in the middle and covered with a protective outer shell 31, which has vent holes 311 for dissipation of heat. The output end of the air pump 3 is connected to one bend 16 by an air tube 32. When the air pump 3 is started, a flow of air is driven through the air tube 32 into the bottom cross tube 121. The air distributors 4 are perpendicularly connected to the bottom cross tube 121 at two opposite sides by a respective connector 41. Each of the air distributors 4 (referring also to FIG. 6) is comprised of a tube 42, a plug member 43 connected between one end of the tube 42 and one connector 41, a tubular membrane 44 covered around the tube 42 and the plug member 43, and two end caps 45 fastened to two opposite ends of the tube 42 to hold down the tubular membrane 44. The plug member 43 has an air passage 431 for guiding air from the bottom cross tube 121 into the space within the tubular membrane 44 outside the tube 42 for permitting air to be further forced out of the tubular membrane 44 through fine splits (not shown) thereof, and therefore air bubbles of about 1–4 mm are released into the rearing pond in which the air supply apparatus is installed. The baffle assembly 5 comprises two symmetrical baffle boards 51 pivotably connected to the cross bar 14 at two opposite sides, and an angle adjustment frame 52 connected between the cross bar 14 and the baffle boards 51 to hold the baffle boards 51 at the desired angle. Each of the baffle boards 51 is comprised of a plurality of flat plastic boards for example polyethylene boards 511 connected together by longitudinal and transverse ribs 512. The angle adjustment frame 52 comprises two parallel upright frames 522 fixedly secured to the cross bar 14, and two connecting bars 521 connected between the baffle boards 51 and the upright frames 522. The parallel upright frames 522 have a respective longitudinal slot 5221. Each of the connecting bars 521 has one end pivoted to one baffle board 51, and a longitudinal series of locating holes 5211. By connecting the longitudinal series of locating holes 5211 of the connecting bars 53 together and fixing them to the longitudinal slots 5221 of the upright frames 522 by locks, the baffle assembly 5 is fixed to the framework 1 at the desired angle. The angular position of the baffle assembly 5 can be changed by changing the combined length of the connecting bars 521 (see FIG. 4). Furthermore, a plurality of plastic wires 513 are suspended from the bottom side of each of the baffle boards 51 above the air distributors 4.

When installed, the angular position of the baffle assembly 5 and the elevation of the top transverse rack 111 are properly adjusted according to the depth of the rearing pond. When the air pump 3 is operated, air is forced into the air tube 32, then into the air distributors 4 through the bottom cross tube 121 and the connectors 41, and therefore air bubbles are continuously released from the tubular membranes 44 of the air distributors 4 into water in the rearing pond (see also FIG. 8). When air bubbles are continuously released from the air distributors 4, the suspension wires 513 and the baffle boards 51 detain the upward movement of the air bubbles, permitting oxygen to be dissolved into water. The aforesaid air tube 32 can be an air hose or a rigid tube; the floats 2 can be of any of a variety of buoyancy, means that carry the framework 1 in water; the baffle boards 51 can also be made of corrugated sheets and reinforced by triangular ribs.

Figure 1:
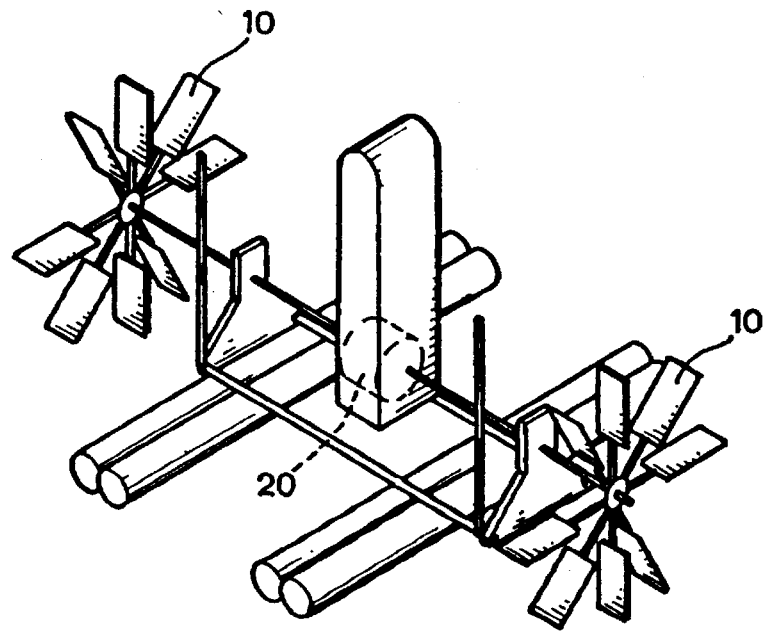
FIG. 1 shows an air supply apparatus for pond fisheries according to the prior art.
Figure 2:
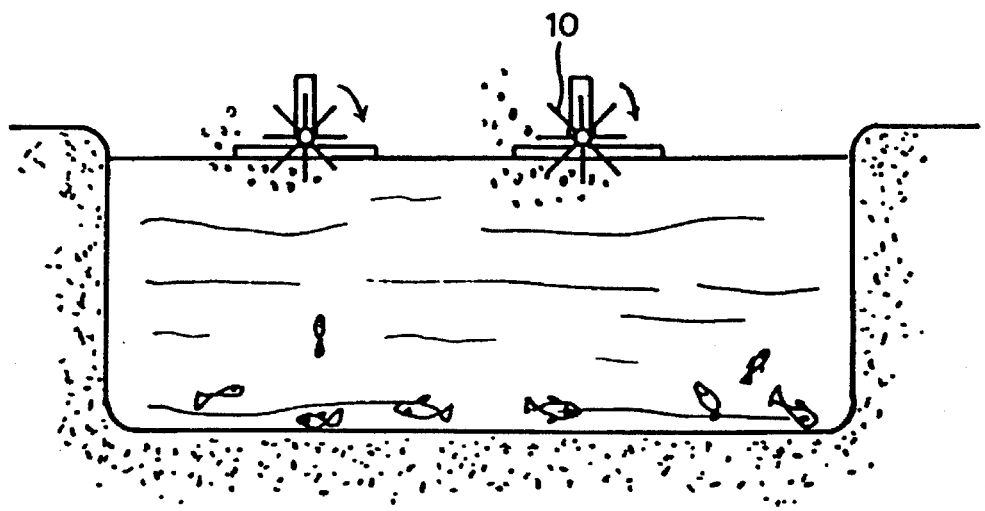
FIG. 2 shows the air supply apparatus of FIG. 1 installed in a rearing pond.
Figure 3:
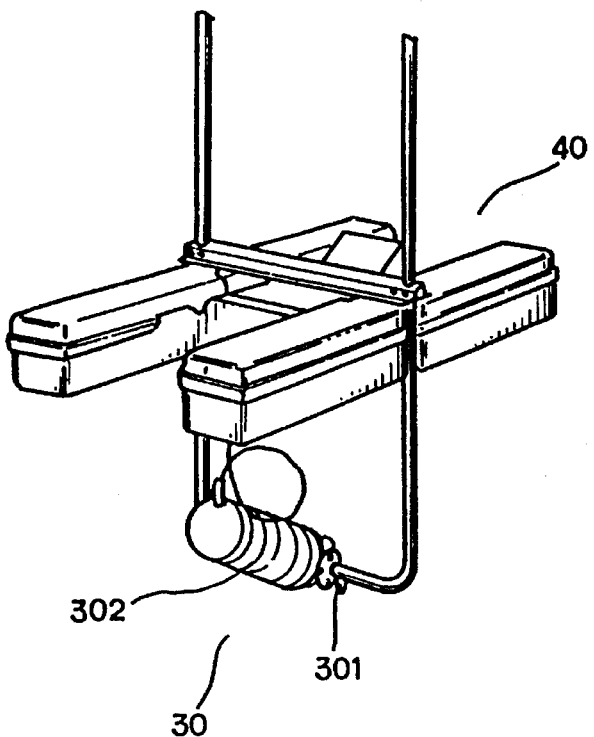
FIG. 3 shows another structure of air supply apparatus for pond fisheries according to the prior art.
Figure 8:
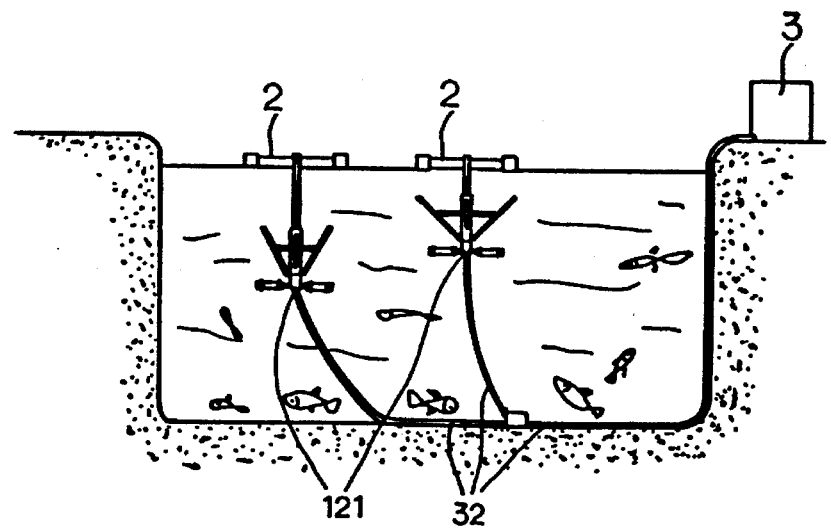
FIG. 8 shows another alternate form of the air supply apparatus according to the present invention.

FIG. 8 shows an alternate arrangement of the present invention, in which one air pump 3 is used and installed in the bank to provide air to the bottom cross tubes 121 of several air treatment apparatus.

Figure 7:
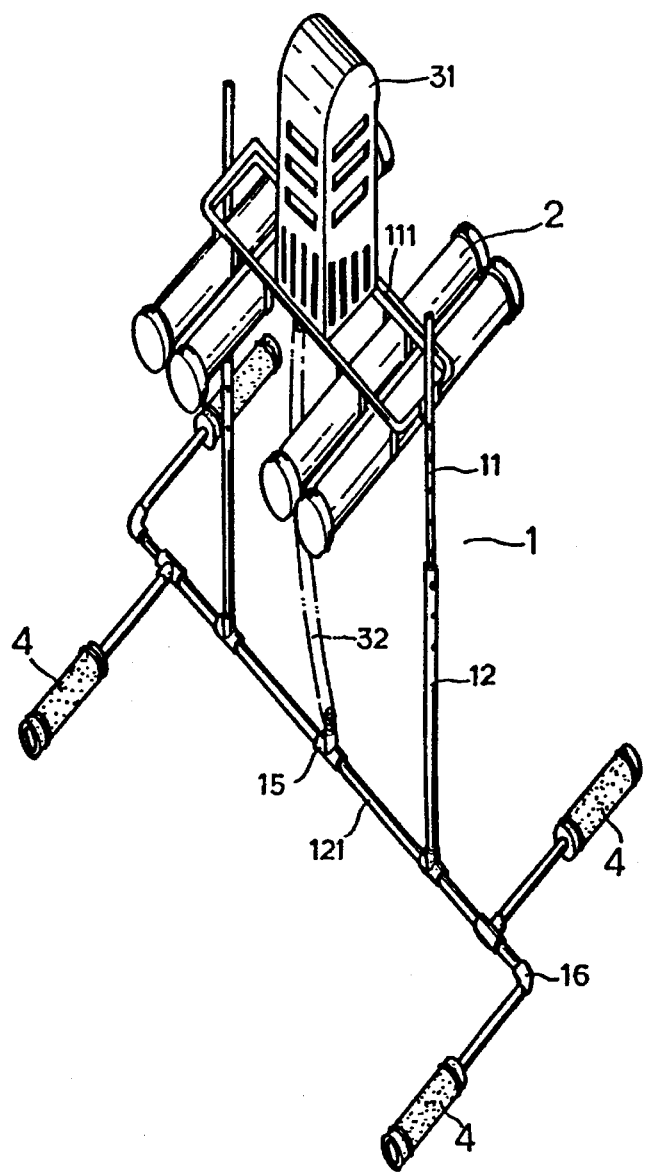
FIG. 7 shows an alternate form of the air supply apparatus according to the present invention.

FIG. 7 shows another alternate form of the present invention in which the aforesaid baffle assembly 5 is eliminated, and the air tube 32 is directly connected to the bottom cross tube 121.

It is to be understood that the drawings are designed for purposes of illustration only, and are not intended as a definition of the limits and scope of the invention disclosed.

I claim:

1. An air supply apparatus for pond fisheries, comprising a framework, float means fastened to a top transverse rack for supporting said framework in water in a rearing pond, an air pump means mounted on said top transverse rack and having an air output port connected to a bottom cross tube by an air tube, and a plurality of air distributors respectively connected to said bottom cross tube for permitting air be forced from said air pump means into water in the rearing pond in the form of air bubbles, wherein a baffle assembly is mounted on a cross bar to detain upward movement of air bubbles released from said air distributors, said baffle assembly comprising two symmetrical baffle boards pivotably connected to said cross bar at two opposite sides, and an angle adjustment frame connected between said cross bar and said baffle boards, said angle adjustment frame comprising two parallel upright frames fixedly secured to said cross bar, and two connecting bars connected between said baffle boards and said upright frames, said upright frames having a respective longitudinal slot, said connecting bars each having a fixed end pivoted to one baffle board, and a free end made with a longitudinal series of locating holes adjustably connected to the longitudinal slots of said upright frames by a lock.

2. The air supply apparatus of claim 1 wherein said framework comprising two upright tubes, two extension tubes respectively and slidably inserted into said upright tubes, lock means to lock said extension tubes in said upright tubes at the desired elevation, said top transverse rack connected between said extension tubes at a top side, said bottom cross tube connected between said upright tubes at a bottom side by bends, and said cross bar connected between said upright tubes above said bottom cross tube.

3. The air supply apparatus of claim 1 wherein said baffle assembly further comprises a plurality of plastic wires suspended from said baffle boards above said air distributors.

4. The air supply apparatus of claim 1 wherein said baffle boards are made from corrugated sheets respectively reinforced by a triangular rib.

* * * * *